(12) United States Patent
An

(10) Patent No.: US 7,837,112 B2
(45) Date of Patent: Nov. 23, 2010

(54) BAR CODE READER AND WEARABLE BAR CODE READER HAVING THE SAME

(75) Inventor: Hyun Woo An, Seoul (KR)

(73) Assignee: Bluebird Soft Co., Ltd. (KR)

( * ) Notice: Subject to any disclaimer, the term of this patent is extended or adjusted under 35 U.S.C. 154(b) by 0 days.

(21) Appl. No.: 12/519,646

(22) PCT Filed: Dec. 14, 2007

(86) PCT No.: PCT/KR2007/006559

§ 371 (c)(1),
(2), (4) Date: Jun. 17, 2009

(87) PCT Pub. No.: WO2008/075859

PCT Pub. Date: Jun. 26, 2008

(65) Prior Publication Data

US 2009/0272811 A1      Nov. 5, 2009

(30) Foreign Application Priority Data

Dec. 18, 2006   (KR) ................ 10-2006-0129089

(51) Int. Cl.
*G06K 7/10*  (2006.01)
(52) U.S. Cl. .................. 235/462.44; 235/462.43; 235/462.01
(58) Field of Classification Search .......... None
See application file for complete search history.

(56) References Cited

U.S. PATENT DOCUMENTS

| | | | |
|---|---|---|---|
| 4,325,106 A * | 4/1982 | Bartunek et al. ............ 362/157 |
| 4,766,299 A | 8/1988 | Tierney et al. |
| 5,212,372 A * | 5/1993 | Quick et al. ........... 235/462.44 |
| 5,340,972 A | 8/1994 | Sandor |
| 6,688,526 B2 * | 2/2004 | Metlitsky et al. ....... 235/462.44 |
| 2005/0087603 A1 * | 4/2005 | Koenck et al. ......... 235/472.02 |
| 2006/0006486 A1 * | 1/2006 | Seo et al. .................... 257/433 |

FOREIGN PATENT DOCUMENTS

JP      2003-016380      1/2003

OTHER PUBLICATIONS

International Search Report-PCT/KR2007/006559 dated Mar. 18, 2008.
Written Opinion-PCT/KR2007/006559 dated Mar. 18, 2008.

* cited by examiner

*Primary Examiner*—Michael G Lee
*Assistant Examiner*—Matthew Mikels
(74) *Attorney, Agent, or Firm*—Cantor Colburn LLP

(57) ABSTRACT

Provided are a bar code reader and a wearable bar code reader having the bar code reader. The bar code reader includes; a main board, a casing that has an upper casing with at least one button hole piercing therethrough, a lower casing assembled to the upper casing, and a projection unit coupled to one side of the upper and lower casings to assist joining the upper and lower casing. An input button unit is coupled to the casing having at least one portion outwardly exposed through at least one button hole, and is electrically connected to the main board. Also, a bar code reading unit included within the casing for enabling external projection is electrically connected to the main board for reading a bar code of a target object, and a bar code support bracket is coupled to the casing for supporting the bar code reading unit.

11 Claims, 3 Drawing Sheets

[Fig. 1]
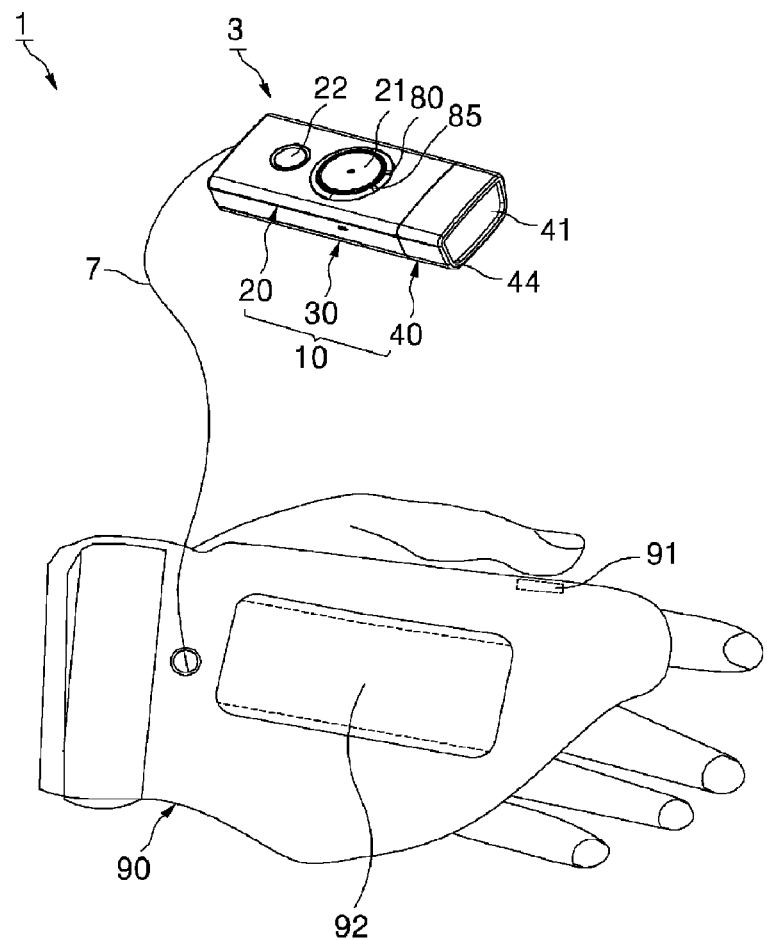
[Fig. 2]
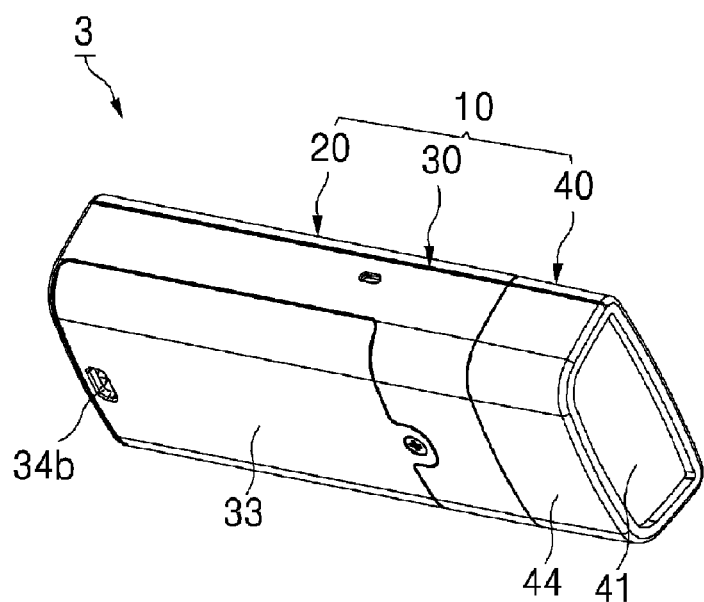

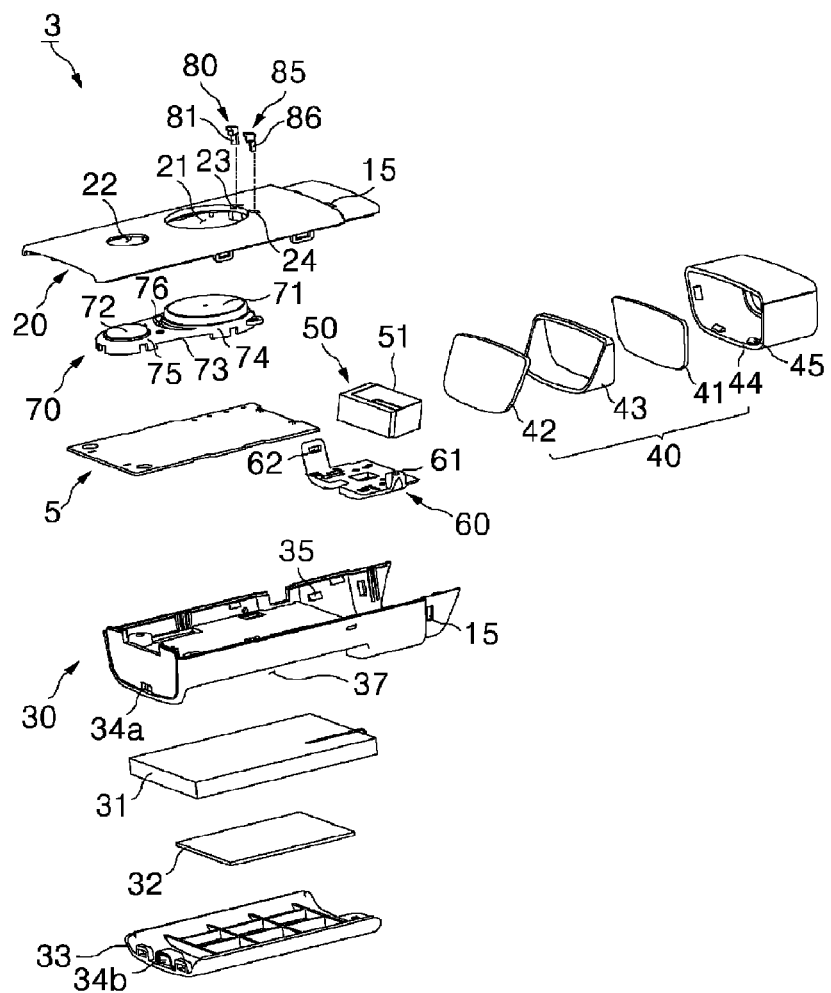
[Fig. 3]
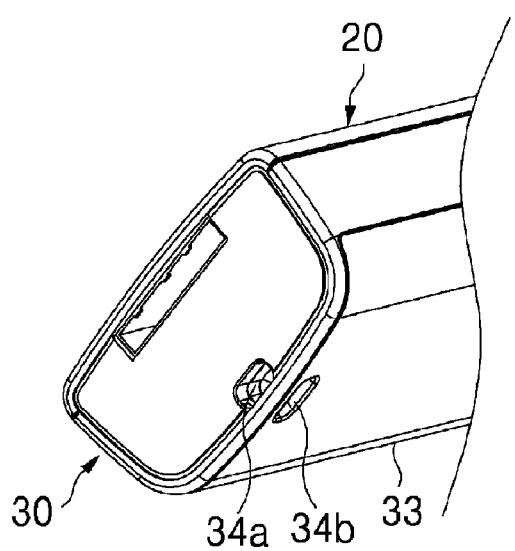
[Fig. 4]

[Fig. 5]
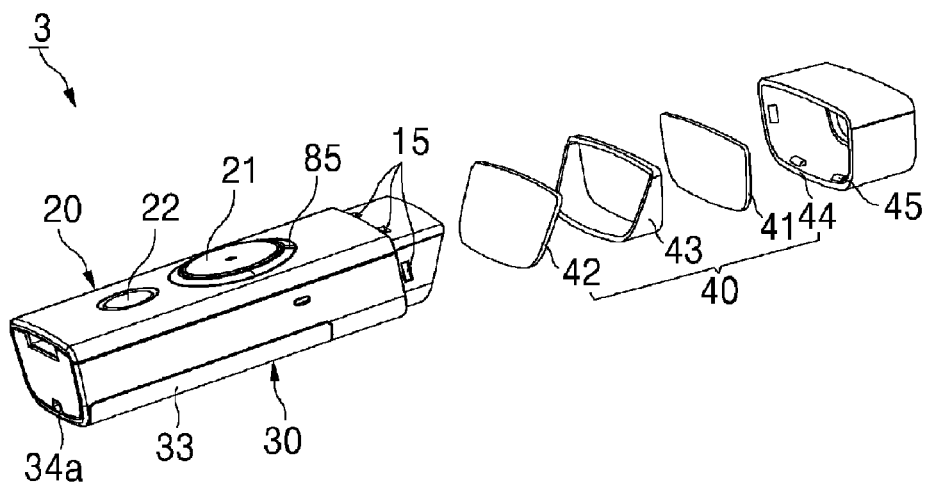
[Fig. 6]
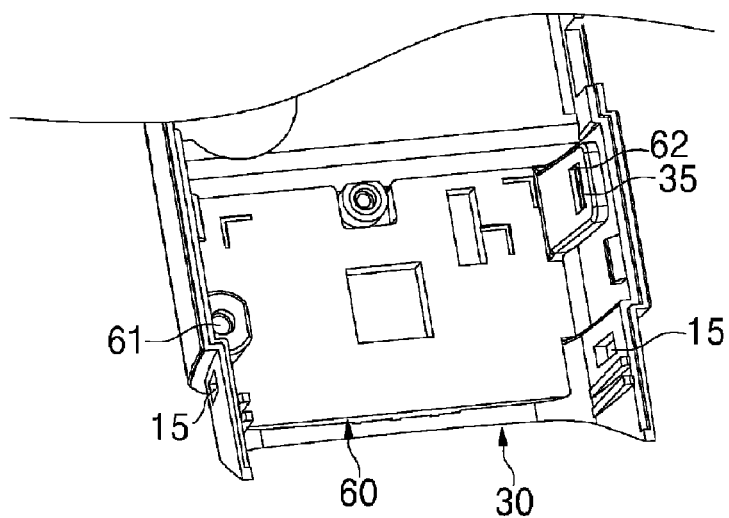
[Fig. 7]
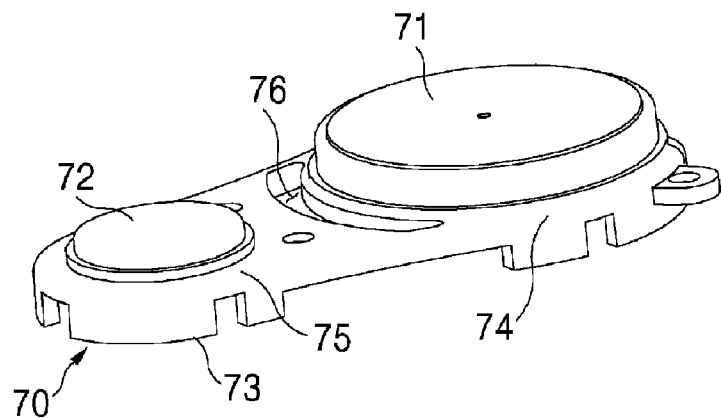

BAR CODE READER AND WEARABLE BAR CODE READER HAVING THE SAME

TECHNICAL FIELD

The present invention is directed to a bar code reader and a wearable bar code reader having the same, and more particularly, to a bar code reader simply assembled and dissembled and easily operated, allowing a user to conveniently use it, and a wearable bar code reader having the same.

BACKGROUND ART

Codes generally designate English characters, numerals or special symbols for recognizing predetermined objects. However, it is a troublesome and difficult job when memorizing every code one by one and sending it into a computer. In particular, separate code managing of diverse kinds of items such as daily commodities is next to impossible, and such the code managing is practically insignificant even regardless of being realized.

In order to solve these problems, bar codes was developed by combining variously thick bars as codes instead of ordinary codes, and an apparatus of optically reading and supplying the bar codes into a computer system is referred to as a bar code reader.

In other words, a bar code reader named as a bar code reading machine or a bar code scanner is one kind of an input device that reads out an electronic signal produced by an intensity of reflected light after emitting an electron beam onto a bar code printed on a certain place of a target object.

The bar code reader uses an optical theory of converting the above-stated electronic signal to an inner code of a computer by a logic circuit of a controller.

Actually, it is commonly taken place that the bar code printed on an item is read using the bar code reader when a customer purchases commodities in a store such as a supermarket to thereby immediately make sales data. Because of advantages of an accurate data input and a convenient use, the bar code is being widely available from the production management to the sales management of commodities, and especially is regarded as an evolution in a distribution field. Accordingly, the bar code reader is further frequently used in recent years, and is easily found in small-scale shops as well as large-sized discount markets.

A structure of a conventional bar code reader will be briefly described. The bar code reader includes a casing equipped with internal components, a bar code reading unit of reading a bar code printed on a target object, a button of operating the bar code reading unit, and a main board electrically connected to the bar code reading unit to control information of the readout bar code.

In view of the foregoing structure, an electron beam is emitted from the bar code reading unit when pressing a button to read the bar code. Then, information with respect to the readout bar code is stored in the main board or sent through a wire or a wireless path under the control of the main board, which is then supplied to an output apparatus such as a monitor. By doing so, a user can recognize the information with respect to the bar code.

However, such a conventional bar code reader has a structure too complicated to be easily assembled nor dissembled, and is relatively large to be fastidious when being carried in a user's pocket, and so on.

DISCLOSURE OF INVENTION

Technical Problem

The present invention provides a bar code reader portable by being manufactured in a small size, and conveniently used by facilitating manipulation by a user while being simply assembled and dissembled.

The present invention also provides a wearable bar code reader, in which a portable bar code reader manufactured in a small size, and conveniently used by facilitating manipulation by a user while being simply assembled and dissembled can be equipped to a glove to further improve operation efficiency.

Advantageous Effects

A bar code reader according to the present invention is portable by being manufactured in a small size and is easily manipulated while being simply assembled and dissembled, so that a user can conveniently use it.

Also according to the present invention, a bar code reader, which can be manufactured in a small size to be portable and is easily manipulated while being simply assembled and dissembled to be conveniently used, can be equipped to a glove, thereby further improving operational efficiency.

DESCRIPTION OF DRAWINGS

FIG. 1 is a perspective view illustrating installing a wearable bar code reader according to an embodiment of the present invention.

FIG. 2 is a perspective view illustrating a rear surface of the bar code reader of FIG. 1.

FIG. 3 is an exploded perspective view illustrating the bar code reader of FIG. 1.

FIG. 4 is a partially enlarged perspective view illustrating a communication hole formed when a lower casing is coupled to a battery cover.

FIG. 5 is a perspective view illustrating a projection unit coupled to one sides of an upper casing and a lower casing of FIG. 3.

FIG. 6 is a side view illustrating a bar code support bracket coupled to the lower casing of FIG. 3.

FIG. 7 is a partially enlarged perspective view illustrating an input button unit of FIG. 3.

BEST MODE

According to an embodiment of the present invention, there is provided a bar code reader including a main board; and a casing having an upper casing with at least one button hole piercing therethrough, a lower casing mutually dissembled from and assembled to the upper casing interposing the main board, and a projection unit coupled to one sides of the upper casing and the lower casing to assist joining of the upper casing and the lower casing; an input button unit is coupled to the casing having at least one portion outward exposed through at least one button hole, and electrically connected to the main board for supplying a required signal; a bar code reading unit included within the casing for enabling external projection through the projection unit, and electrically connected to the main board for reading a bar code of a target object; and a bar code support bracket coupled to the casing for supporting the bar code reading unit.

At this time, at least one button hole includes a first button hole and a second button hole disposed in the upper casing separated from the first button hole; and the input button unit includes: a first button having at least one portion externally exposed through the first button hole; a second button having at least one portion externally exposed through the second button hole; and a common rib connecting plate coupled with the first button and the second button to be disposed between the upper casing and the main board, and elastically deformed for supplying each signal of the first button and the second button to the main board in conformity with each pressing of the first button and the second button.

The first button and the second button are coupled to the common rib connecting plate by being separated from each other to correspond to locations of the first button hole and the second button hole, respectively, and a cutaway portion is disposed to the common rib connecting plate between the first button and the second button by cutting a predetermined area for independent pressing of the first button and the second button.

At least one installation hole separated from each other is formed in an outer circumferential area of the first button hole of the upper casing, and a light guide member is installed to the installation hole for emitting light of a light emitting diode that is electrically connected to the main board for emitting the light.

At least one installation holes includes a first installation hole and a second installed hole, and a bar code operation light guide member for sending the light of a bar code operation light emitting diode that emits the light when operating the bar code reading unit is installed into the first installation hole, and a Bluetooth operation light guide member for sending the light of a Bluetooth operation light emitting diode that irradiates the light when operating the Bluetooth electrically connected to the main board is installed into the second installation hole.

A hook projecting from one sidewall of the lower casing is furnished to the lower casing, and the bar code support bracket includes a screw hole through which a screw can be fitted to the lower casing, and a hook catch hole caught by the hook.

At this time, the projection unit includes: a first projection window substantially parallel with the bar code reading unit; a second projection window separated from the first projection window, and slanted with respect to the first projection window; an angle adjusting member disposed between the first projection window and the second projection window for supporting the second projection window; and a projection window receiving rim for accommodating the first projection window, the second projection window and the angle adjusting member, and coupled to the upper casing and the lower casing.

Also, the projection window receiving rim is formed of a rubber substance.

Furthermore, a battery holder unit for accommodating a battery is formed to a rear end of the lower casing, and the lower casing includes a battery cover covering the battery holder unit; and a battery cushion member disposed to one side of the battery installed to the battery holder unit for absorbing a shock applied to the battery.

Here, wherein the main board and the bar code reading unit is connected by a Flexible Printed Circuit Board (FPCB).

According to another aspect of the present invention, there is provided a wearable bar code reader including: the bar code reader stated as above; a conduction line electrically connected to the main board; and a glove having an external button electrically connected to the conduction line for operating the bar code reading unit.

Additionally, the wearable bar code reader includes a pocket provided on a surface of glove for accommodating the casing.

Mode for Invention

Embodiments of the present invention are described in detail in the detailed description and the accompanying drawings. The advantages and features of the present invention and a method of realizing the present invention will be clarified with reference to embodiments which will now be described more fully with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. The present invention is defined by definitions recited in the claims only. In the specification, like reference numerals in the drawings denote like elements.

FIG. 1 is a perspective view illustrating coupling a wearable bar code reader according to an embodiment of the present invention. FIG. 2 is a perspective view illustrating a rear surface of the bar code reader of FIG. 1. FIG. 3 is an exploded perspective view illustrating the bar code reader of FIG. 1. FIG. 4 is a partially enlarged perspective view illustrating a communication hole formed when a lower casing is coupled to a battery cover. FIG. 5 is a perspective view illustrating a projection unit coupled to one sides of an upper casing and a lower casing of FIG. 3. FIG. 6 is a side view illustrating a bar code support bracket coupled to the lower casing of FIG. 3. FIG. 7 is a partially enlarged perspective view illustrating an input button unit of FIG. 3.

As illustrated in the drawings, a wearable bar code reader 1 includes a bar code reader 3, a conduction line 7 electrically connected to a main board 5 of the bar code reader 3, and a glove 90 installed with an external button 91 that is electrically connected to the conduction line 7 for operating a bar code reading unit 50 of the bar code reader 3.

At this time, the bar code reader 3 includes the main board 5. Also, a casing 10 has an upper casing 20 and a lower casing 30 mutually assembled to or dissembled from each other, interposing the main board 5 between them, and a projection unit 40 furnished to one sides of the upper casing 20 and the lower casing 30. Further to these, the bar code reading unit 50 electrically connected to the main board 5 within the casing 10 reads a bar code that is a target object of the reading. Also, a bar code support bracket 60 supports the bar code reading unit 50 within the casing 10, and an input button unit 70 includes a first button 71 and a second button 72, which are each coupled to a button hole 21 and a button hole 22 formed in the upper casing 20 to thereby operate the bar code reading unit 50. A bar code operation light guide member 80 installed to a periphery of the first button 21 displays an operational status by flickering when the bar code reading unit 50 is operated. Additionally, a Bluetooth operation light guide member 85 formed adjacently to the bar code operation light guide member 80 displays an operational status by flickering when the Bluetooth is operated.

In this embodiment, the bar code reader 3 furnished to the wearable bar code reader 1 will be described while describing the wearable bar code reader 1, but may be independently used in some cases.

The main board 5 controls the overall operation of the wearable bar code reader 1 according to this embodiment. The input button unit 70, a battery 31, the bar code reading unit 50, and the external button 91 of the glove 90 are electrically connected to the main board 5 so that the operation of these components is organically interlinked. For example, when the first and second buttons 71 and 72 of the input button unit 70 are pressed, a predetermined input signal is supplied to the main board 5 that in turn operates the bar code reading unit 50 to read the bar code of the target object. Then, readout information is again stored in the main board 5 or is sent to a nearby computer device (not shown).

The casing 10 forms an external appearance of the wearable bar code reader 1 according to this embodiment. The casing 10 includes the upper casing 20, the lower casing 30 and the projection unit 40 coupled to one sides of the upper casing 20 and the lower casing 30 when the upper and lower casings 20 and 30 are assembled to each other. An internal space is provided by assembling the upper casing 20, the lower casing 30, and the projection unit 40 to receive the internally installed components. Furthermore, the assembling and the dissembling of the casing 10 are so easy to facilitate the maintenance of the internally installed components.

The upper casing 20 has two button holes 21 and 22 and two installation holes 23 and 24. Hereinafter, for convenience of description, two button holes 21 and 22 are designated by a first button hole 21 and a second button hole 22, and two installation holes 23 and 24 are designated by a first installation hole 23 and a second installation hole 24.

The first button hole 21 and the second button hole 22 partially expose the first button 71 and the second button 72 of the input button unit 70 internally installed within the casing 10. Also, the first installation hole 23 and the second installation hole 24 in an outer peripheral region of the first button hole 21 are separated apart from each other, for receiving the bar code operation light guide member 80 and the Bluetooth operation light guide member 85, which will be described later. The description of the first and second button holes 21 and 22 and the first and second installation holes 24 will be added when describing components coupled to these holes.

The lower casing 30 supports internal components such as the main board 5 and the bar code support bracket 60, and accommodates the battery 31. A battery holder 37 having the battery 31 therein is provided to a rear end of the lower casing 30, and is covered with a battery cover 33 to securely shield the battery 31 included therein and impedes separation of the battery 31 from the battery holder 37. Moreover, a battery cushion member 32 is provided between the battery 31 and the battery cover 33 to absorb a shock applied to the battery 31, so that the state of the battery 31 can be satisfactorily maintained.

Referring to FIG. 4, communication holes 34a and 34b are communicated with each other in a rear end and the battery cover 33 of the lower casing 30 when being coupled, so that a hook (not shown) can be caught by the communication holes 34a and 34b after coupling the rear end of the lower casing 30 and the battery cover 33. Because the communication holes 34a and 34b caught by the hook and so on are respectively formed in the lower casing 30 and the battery cover 33, the greater firmness can be secured than forming the communication hole in either the lower casing 30 or the battery 33 to thereby cause no concern of damage.

The projection unit 40, as illustrated in FIG. 5, is coupled to one sides of the upper casing 20 and the lower casing 30 which are being assembled to each other to project an electron beam emitted from the bar code reading unit 60. The projection unit 40 of this embodiment includes a first projection window 41 disposed in a lateral direction to the electron beam emitted from the bar code reading unit 50, a second projection window 42 separated from and inclined with respect to the first projection window 41, and an angle adjusting member 43 disposed between the first projection window 41 and the second projection window 42 to support the second projection window 42. Also, the projection unit 40 includes a projection window receiving rim 44 that is coupled to one sides of the upper casing 20 and the lower casing 30 when being assembled to each other, while accommodating the above-described components.

Light emitted from the bar code reading unit 50 can be irradiated at various angles by the projection unit 40 having the foregoing construction. In more detail, the angle adjusting member 43 that adjusts an angle of the second projection window 42 with respect to the first projection window 41 can be selected at various angles as required, so that the direction of the light emitted from the bar code reading unit 50 can be adjusted. Therefore, if a bar code of a target object is printed on a hardly recognizable location, the direction of the emitted electron beam of the projection unit 40 according to this embodiment is appropriately adjustable so that the reading of the bar code can be quickly and accurately carried out.

The projection window receiving rim 44 is formed of a rubber substance capable of buffering a shock caused by a collision when colliding with an external target object. Additionally, a plurality of hooks 45 are formed in a circumferential direction of an inner surface of the projection window receiving rim 44, and a plurality of hook holes 15 caught by the hooks 45 are formed in the upper casing 20 and the lower casing 30. By this construction, the casing 10 and the projection unit 40 can be firmly coupled to each other. Furthermore, since the projection window receiving rim 44 is formed of rubber, the casing 10 and the projection unit 40 can be easily assembled and dissembled.

The bar code reading unit 50 acting for reading the bar code of the target object by emitting the electron beam is supported by the bar code support bracket 60 coupled to the inner edge of the lower casing 30. The bar code reading unit 50 includes a beam emission lens 51 for emitting the electron beam toward the bar code of the target object, and a sensor (not shown) for monitoring the electron beam reflected from the bar code of the target object. The bar code reading unit 50 and the main board 5 are electrically connected to an unshown Flexible Printed Circuit Board (FPCB), so that bar code information of the target object monitored by the sensor is supplied to the main board 5, and then a predetermined operation is performed under the control of the main board 5.

The above-described bar code reading unit 50 is fixedly supported by the bar code support bracket 40 so as to accurately emit the electron beam onto the bar code of the target object while being supported within the casing 10.

The bar code support bracket 60 has to be first fixedly coupled to the lower casing 30 to inhibit the moving of the bar code reading unit 50. Referring to FIG. 6, the bar code support bracket 60 is shaped to allow an outer side contacting the lower casing 30 to correspond to an inner side of the lower casing 30. A screw hole 61 capable of receiving a screw (not shown) therethrough is formed in one side of the bar code support bracket 60 that is to be coupled to the lower casing 30 using the screw. In the other side of the bar code support bracket 60 in a hook catch hole 62 caught by the hook 35 formed to the lower casing 30 is formed.

Thus, the bar code support bracket 60 can not only be firmly coupled to the lower casing 30 but also support the bar code reading unit 50 at a proper strength within a narrow structure to assist to reduce an overall dimension of the product. In addition, the foregoing bar code reading unit 50 is supportively coupled to the bar code support bracket 60, so that the bar code reading unit 50 can perform the reading operation by accurately emitting the electron beam onto the bar code of the target object.

Referring to FIG. 7, the input button unit 70 includes a first button 71 and a second button 72 partially exposed when being coupled to the first button hole 21 and the second button hole 22 formed through the upper casing 20, and a common rib connecting plate 73 having an upper surface connected to lower ends of the first button 71 and the second button 72 and a lower surface connected to the main board 5 for thereby supplying a predetermined input signal to the main board 5 according to a pressing operation of the first button 71 and the second button 72.

The first button 71 is pressively coupled to the first button hole 21 formed in the upper casing 20. When the first button 71 is pressed, the predetermined input signal is supplied to the main board 5 that in turn operates the bar code reading unit 50 to read the bar code of the target object. As described above, the readout bar code information is stored in a memory module (not shown) mounted to the main board 5 or supplied to a nearby computer system (not shown) by a wireless communication system (Bluetooth).

Meanwhile, the second button 72 acts for cancelling the bar code read by the first button 71. Therefore, the bar code of the target object can be easily read out using the first button 71, and, moreover, the readout bar code can be easily cancelled in some cases to facilitate a user's manipulation.

The common rib connecting plate 73 is formed of a rubber substance to be electrically moved by the pressing of the first button 71 and the second button 72, and includes a cutaway portion 76 in the central portion thereof so as not to interfere respective pressing of the first button 71 and the second button 72. When the first button 71 is pressed, due to the cutaway portion 76, only a portion 74 of the common rib connecting plate 73 adjacent to the first button 71 is elastically moved to supply a predetermined input signal to the main board 5, and only a portion 75 of the common rib connecting plate 73 adjacent to the second button 72 is elastically moved to supply a predetermined input signal to the main board 5. That is, in order to simplify the fabricating and the assembling, the common rib connecting plate 73 is formed by one piece as one body while the cutaway portion 76 is formed in the central region. By doing so, the pressing of the first button 71 and the second button 72 can be independently and accurately performed.

The bar code operation light guide member 80, as illustrated in FIGS. 1 and 3, is installed to the first installation hole 23, and electrically connected to the main board 5 to display whether the reading by the bar code reading unit 50 is performed or not. The bar code operation light guide member 80 is adjacent to a light emitting diode (LED) 81, and emits light when the bar code reading unit 50 is operated to make a user confirm whether the reading is performed or not.

As illustrated in FIGS. 1 and 3, the Bluetooth operation light guide member 85 is installed to the second installation hole 24 and electrically connected to the main board 5 to display whether the Bluetooth operation is performed or not, similarly to the bar code operation light guide member 80. The Bluetooth operation light guide member 85 is adjacent to the Bluetooth light emitting diode 86, and emits the light when the Bluetooth operation light emitting diode 86 is operated to make a user confirm whether the reading is performed or not.

The Bluetooth is defined as a standard enabling the wireless communication or a product in conformity with the standard. In this embodiment, the Bluetooth denotes that the reading or cancelling of the bar code of the target object using the bar code reading unit 50 is wireless communicated to a nearby computer system or, reversely, predetermined data is wireless communicated to the main board 5 of this embodiment from the computer system, etc.

The wearable bar code reader 1 of this embodiment can improve an efficiency of working since it supplies or receives information by the wireless communication, i.e., the Bluetooth system.

Meantime, the wearable bar code reader 1 may be included in the glove 90 for user's convenience. In other words, the wearable bar code reader 1 according to this embodiment further includes the glove 90 furnished with the external button 91 that electrically connected to the conduction wire 7 electrically connected to the main board 5 to operate the bar code reading unit 50. Thus, the bar code reader 3 may be operated while wearing the glove 90 as required.

A pocket 92 with open head and tail portions is prepared on an upper surface of the glove 90 to accommodate the bar code reader 3 that forward emits the electron beam. Also, the external button 91 is invisibly installed to a portion of the glove 90 to be put with an index finger of a user, so that a desired input can be sent to the main board 5 by pressing the external button 91. By this construction, the user can further easily manipulate the bar code reader 3 to quickly carry out the predetermined operation.

Hereinafter, a method of operating the wearable bar code reader 1 having the above construction will be described. At this time, a method of operating by directly gripping the bar code reader 3 furnished to the wearable bar code reader 1 will be described first for providing a method of independently operating the bar code reader 3. Then, a method of operating the wearable bar coder reader 1 provided with the bar code reader 3 will be described.

First, when the bar code reading is performed by emitting the electron beam onto a bar code printed on a target object, a user grips the bar code reader 3 according to this embodiment to make the projection unit 40 face the front side. Also, the bar code reader 3 is closer to the target object until the electron beam emitted from the bar code reading unit 50 reaches the bar code of the target object. Successively, the first button 71 partially exposed in the upper casing 20 is pressed.

Then, by the pressing the first button 71, the common rib connecting plate 73 electrically connected to the main board 5 is elastically moved to supply a predetermined input signal to the main board 5. Thereafter, the main board 5 operates the bar code reading unit 50 to emit the electron beam to the bar code of the target object, thereby obtaining information with respect to the bar code. The obtained information is stored in the main board 5 or is wireless communicated by the Bluetooth mode to the nearby computer system, and then is stored or externally provided.

At the moment of reading the bar code by emitting the electron beam from the bar code reading unit 50 while performing the above-mentioned operation, the light is emitted to the bar code light emitting member 80 by the main board 5 to allow the user to recognize whether the bar code reading is adequately performed or not. Moreover, when the wireless communication is conducted by the Bluetooth mode by pressing the first button 71, the light is emitted to the Bluetooth lighting member 85 so that the user can confirm whether the wireless communication is properly carried out or not.

Otherwise, if the bar code of the target object is not read but is cancelled, the second button 72 partially exposed in the upper casing 20 is pressed. Then, the pressing of the second button 72 is sent to the main board 5 through the common rib connecting plate 73 electrically connected to the main board 5. Operation followed by the above can be inferred from the operation in connection with the foregoing pressing of the first button 71, which thus will not be described.

On the other hand, a method of manipulating the wearable bar code reader 1, in which the bar code reader 3 is installed to the glove 90, will be described. First, the projection unit 40 is accommodated within the pocket 92 of the glove 90 to face forward, and the glove 90 is put on. Then, when the external button 91 installed to a portion of the glove 90 to be fitted with the index finger is pressed, as described above, the bar code reading of the target object can be substantially and equally performed.

The bar code reader and the wearable bar code reader according to the present invention as described as above can be easily assembled and dissembled while the assembling state can be firmly maintained. Also, the bar code reader can be manufactured in the small size to be portable, and can be simply manipulated when being accommodated within the glove to allow the user to conveniently use.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a bar code reader is manufactured in a small size to be portable and is easily manipulated while being simply assembled and dissembled, so that a user can conveniently use it.

Also according to the present invention, a bar code reader, which can be manufactured in a small size to be portable and is easily manipulated while being simply assembled and dissembled to be conveniently used, can be equipped to a glove, thereby further improving operational efficiency.

The invention claimed is:

1. A bar code reader comprising:
a main board;
a casing having an upper casing with at least one button hole piercing therethrough, a lower casing separable from and assembled to the upper casing, wherein the upper casing and lower casing interpose the main board therebetween, and a projection unit coupled to one side of the upper casing and the lower casing to assist joining of the upper casing and the lower casing;
an input button unit coupled to the casing having at least one portion outwardly exposed through at least one button hole, and electrically connected to the main board for supplying a required signal thereto;
a bar code reading unit included within the casing for enabling external projection through the projection unit, and electrically connected to the main board for reading a bar code of a target object; and
a bar code support bracket coupled to the casing for supporting the bar code reading unit,
wherein the at least one button hole comprises a first button hole and a second button hole disposed in the upper casing separated from the first button hole, and
wherein the input button unit comprises:
a first button having at least one portion externally exposed through the first button hole;
a second button having at least one portion externally exposed through the second button hole; and
a common rib connecting plate coupled with the first button and the second button to be disposed between the upper casing and the main board, and elastically deformed for supplying each signal of the first button and the second button to the main board in conformity with each pressing of the first button and the second button.

2. The bar code reader of claim 1, wherein the first button and the second button are coupled to the common rib connecting plate by being separated from each other to correspond to locations of the first button hole and the second button hole, respectively, and a cutaway portion is disposed to the common rib connecting plate between the first button and the second button by cutting a predetermined area for independent pressing of the first button and the second button.

3. The bar code reader of claim 1, wherein at least one installation hole separated from each other is formed in an outer circumferential area of the first button hole of the upper casing, and a light guide member is installed to the installation hole for emitting light of a light emitting diode that is electrically connected to the main board for emitting the light.

4. The bar code reader of claim 3, wherein at least one installation holes comprises a first installation hole and a second installed hole, and a bar code operation light guide member for sending the light of a bar code operation light emitting diode that emits the light when operating the bar code reading unit is installed into the first installation hole, and a Bluetooth operation light guide member for sending the light of a Bluetooth operation light emitting diode that irradiates the light when operating the Bluetooth electrically connected to the main board is installed into the second installation hole.

5. The bar code reader of claim 1, wherein a hook projecting from one sidewall of the lower casing is furnished to the lower casing, and the bar code support bracket comprises a screw hole through which a screw can be fitted to the lower casing, and a hook catch hole caught by the hook.

6. The bar code reader of claim 1, wherein the projection unit comprises:
a first projection window substantially parallel with the bar code reading unit;
a second projection window separated from the first projection window, and slanted with respect to the first projection window;
an angle adjusting member disposed between the first projection window and the second projection window for supporting the second projection window; and
a projection window receiving rim for accommodating the first projection window, the second projection window and the angle adjusting member, and coupled to the upper casing and the lower casing.

7. The bar code reader of claim 6, wherein the projection window receiving rim is formed of a rubber substance.

8. The bar code reader of claim 1, wherein a battery holder unit for accommodating a battery is formed to a rear end of the lower casing, and the lower casing comprises:
a battery cover covering the battery holder unit; and
a battery cushion member disposed to one side of the battery installed to the battery holder unit for absorbing a shock applied to the battery.

9. The bar code reader of claim 1, wherein the main board and the bar code reading unit is connected by a Flexible Printed Circuit Board (FPCB).

10. A wearable bar code reader comprising:
a bar code reader claimed in claim 1;

a conduction line electrically connected to the main board; and a glove having an external button electrically connected to the conduction line for operating the bar code reading unit.

11. The wearable bar code reader of claim 10, comprising a pocket provided on a surface of the glove for accommodating the casing.

* * * * *